(12) United States Patent
Fu

(10) Patent No.: US 9,618,810 B2
(45) Date of Patent: Apr. 11, 2017

(54) ARRAY SUBSTRATE AND LIQUID CRYSTAL DISPLAY PANEL

(71) Applicant: Shenzhen China Star Optoelectronics Technology Co., Ltd., Shenzhen (CN)

(72) Inventor: Yanfeng Fu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 99 days.

(21) Appl. No.: 14/766,757

(22) PCT Filed: Mar. 10, 2015

(86) PCT No.: PCT/CN2015/073925
§ 371 (c)(1),
(2) Date: Aug. 10, 2015

(87) PCT Pub. No.: WO2016/127464
PCT Pub. Date: Aug. 18, 2016

(65) Prior Publication Data
US 2016/0231631 A1    Aug. 11, 2016

(30) Foreign Application Priority Data
Feb. 11, 2015 (CN) .......................... 2015 1 0072465

(51) Int. Cl.
*G02F 1/1345* (2006.01)
*G02F 1/1362* (2006.01)

(52) U.S. Cl.
CPC ...... *G02F 1/1345* (2013.01); *G02F 1/136227* (2013.01)

(58) Field of Classification Search
CPC ............. G02F 1/1345; G02F 1/136286; G02F 1/1368; G02F 1/136227
See application file for complete search history.

(56) References Cited

U.S. PATENT DOCUMENTS

| | | | | |
|---|---|---|---|---|
| 4,807,973 | A * | 2/1989 | Kawasaki | G02F 1/1309 345/93 |
| 7,145,627 | B2 * | 12/2006 | Lee | G02F 1/134363 349/141 |
| 8,064,027 | B2 * | 11/2011 | Choi | G02F 1/1345 349/149 |
| 2008/0143944 | A1 * | 6/2008 | Chang | G02F 1/1345 349/139 |
| 2011/0090445 | A1 * | 4/2011 | Kim | G02F 1/1339 349/139 |
| 2013/0020120 | A1 * | 1/2013 | Ishihara | H05K 1/183 174/262 |
| 2014/0184969 | A1 * | 7/2014 | Ro | G02F 1/136286 349/43 |
| 2016/0349585 | A1 * | 12/2016 | Yi | G02F 1/13 |

* cited by examiner

*Primary Examiner* — Timothy L Rude

(57) ABSTRACT

An array substrate is disclosed, and has a substrate. A first metal layer, a first insulation layer, a second metal layer, a second insulation layer, and a pixel electrode layer are disposed on the substrate successively. A plurality of first through holes and a plurality of second through holes are disposed on the position of a link line, so as to expose the first metal line and the second metal line. The first metal line is electrically connected to the second metal line through a conductive line of the pixel electrode layer. Thus, the problem of vertical and parallel light lines of a drain discharge module can be efficiently improved.

13 Claims, 1 Drawing Sheet

ARRAY SUBSTRATE AND LIQUID CRYSTAL DISPLAY PANEL

RELATED APPLICATIONS

This application is a National Phase of PCT Patent Application No. PCT/CN2015/073925 having International filing date of Mar. 10, 2015, which claims the benefit of priority of Chinese Patent Application No. 201510072465.2 filed on Feb. 11, 2015. The contents of the above applications are all incorporated by reference as if fully set forth herein in their entirety.

FIELD OF THE INVENTION

The present invention relates to a technical filed of displays, and more particularly to an array substrate and a liquid crystal display panel.

BACKGROUND OF THE INVENTION

In the prior art, while designing an external fan circuit of a thin film transistor (TFT), in order to reduce resistances, a dual-metal design is adopted. Namely, the first metal line and the second metal line are paralleled, so as to reduce the resistances. The first metal line is disposed on a first metal layer within a non-display area, and the second metal is disposed on a second metal layer within a display area, so as to reduce the signal influence which is caused by resistor-capacitor delay distortion.

However, the dual-metal design has a problem: when the first metal line is broken, the unbroken second metal line is used to make conduction. However, this leads resistances of the circuit to be greater. Therefore, vertical light lines and parallel light lines easily appear when a module starts a light, thereby reducing the display quality of a thin film transistor liquid crystal display (TFT LCD).

In summary, for the dual-metal design, one layer is broken and the other is not broken, therefore, the circuit is not completely broken. However, in an array substrate and a liquid crystal test, a problem cannot be detected. When drain discharging to MOD displaying, a lower voltage can be inputted. The difference in resistances under low grayscale and low voltage causes phenomenon of light lines, which affects the display quality.

As a result, it is necessary to provide a new technical solution to solve the problems existing in the conventional technologies, as described above.

SUMMARY OF THE INVENTION

A primary object of the present invention is to provide an array substrate and a liquid crystal display panel, the problem of vertical and parallel light lines of a drain discharge module can be efficiently improved.

To solve the above-described problem, the technical solution of the present invention is as follows:

An array substrate is provided, and comprises:

a substrate;

a first metal layer disposed on the substrate, wherein the first metal layer is formed with a gate of a thin film transistor and a scan line within a display area, and a first metal line within a non-display area;

a first insulation layer disposed on the first metal layer, wherein the first insulation layer isolates the first metal layer from a second metal layer;

the second metal layer disposed on the first insulation layer; wherein the second metal layer is formed with a source of the thin film transistor, a drain of the thin film transistor and a data line within the display area, and a second metal line within the non-display area;

a second insulation layer disposed on the second metal layer, wherein the second insulation layer isolates the second metal layer from a pixel electrode layer;

the pixel electrode layer disposed on the second insulation layer; wherein the pixel electrode layer comprises pixel electrodes within the display area and a conductive line within the non-display area;

wherein the first metal line, the second metal line, and the conductive line are overlapped with each other to be a link line, a plurality of first through holes and a plurality of corresponding second through holes are disposed on the link line; the first through holes expose the first metal line; the second through holes expose the second metal line; the first metal line in the first through hole is connected to the second metal line in the corresponding second through hole through the conductive line; the first through hole penetrates the second insulation layer, the second metal layer and the first insulation layer within the non-display area; the second through hole penetrates the second insulation layer within the non-display area; each of the first through holes is corresponding to two of the second through holes, wherein the second through holes are disposed at two sides of the first through hole.

Preferably, the array substrate further comprises a scan driving chip and a data driving chip, the scan driving chip is electrically connected to the scan line through the link line, and the data driving chip is electrically connected to the data line through the link line.

Preferably, a plurality of the first through holes and a plurality of the corresponding second through holes are uniformly disposed on the link line.

Furthermore, an array substrate is provided, and comprises:

a substrate;

a first metal layer disposed on the substrate, wherein the first metal layer is formed with a gate of a thin film transistor and a scan line within a display area, and a first metal line within a non-display area;

a first insulation layer disposed on the first metal layer, wherein the first insulation layer isolates the first metal layer from a second metal layer;

the second metal layer disposed on the first insulation layer; wherein the second metal layer is formed with a source of the thin film transistor, a drain of the thin film transistor and a data line within the display area, and a second metal line within the non-display area;

a second insulation layer disposed on the second metal layer, wherein the second insulation layer isolates the second metal layer from a pixel electrode layer;

the pixel electrode layer disposed on the second insulation layer; wherein the pixel electrode layer comprises pixel electrodes within the display area and a conductive line within the non-display area;

wherein the first metal line, the second metal line, and the conductive line are overlapped with each other to be a link line, a plurality of first through holes and a plurality of corresponding second through holes are disposed on the link line; the first through holes expose the first metal line; the second through holes expose the second metal line; the first metal line in the first through hole is connected to the second metal line in the corresponding second through hole through the conductive line.

Preferably, the first through hole penetrates the second insulation layer, the second metal layer and the first insulation layer within the non-display area; and the second through hole penetrates the second insulation layer within the non-display area.

Preferably, each of the first through holes is corresponding to two of the second through holes, wherein the second through holes are disposed at two sides of the first through hole.

Preferably, the array substrate further comprises a scan driving chip and a data driving chip, the scan driving chip is electrically connected to the scan line through the link line, and the data driving chip is electrically connected to the data line through the link line.

Preferably, a plurality of the first through holes and a plurality of the corresponding second through holes are uniformly disposed on the link line.

Moreover, a liquid crystal display panel is provided, and comprises an array substrate, a color filter substrate, and a liquid crystal cell disposed between the array substrate and the color filter substrate; the array substrate comprises:

a substrate;

a first metal layer disposed on the substrate, wherein the first metal layer is formed with a gate of a thin film transistor and a scan line within a display area, and a first metal line within a non-display area;

a first insulation layer disposed on the first metal layer, wherein the first insulation layer isolates the first metal layer from a second metal layer;

the second metal layer disposed on the first insulation layer; wherein the second metal layer is formed with a source of the thin film transistor, a drain of the thin film transistor and a data line within the display area, and a second metal line within the non-display area;

a second insulation layer disposed on the second metal layer, wherein the second insulation layer isolates the second metal layer from a pixel electrode layer;

the pixel electrode layer disposed on the second insulation layer; wherein the pixel electrode layer comprises pixel electrodes within the display area and a conductive line within the non-display area;

wherein the first metal line, the second metal line, and the conductive line are overlapped with each other to be a link line, a plurality of first through holes and a plurality of corresponding second through holes are disposed on the link line; the first through holes expose the first metal line; the second through holes expose the second metal line; the first metal line in the first through hole is connected to the second metal line in the corresponding second through hole through the conductive line.

Preferably, the first through hole penetrates the second insulation layer, the second metal layer and the first insulation layer within the non-display area; and the second through hole penetrates the second insulation layer within the non-display area.

Preferably, each of the first through holes is corresponding to two of the second through holes, wherein the second through holes are disposed at two sides of the first through hole.

Preferably, the array substrate further comprises a scan driving chip and a data driving chip, the scan driving chip is electrically connected to the scan line through the link line, and the data driving chip is electrically connected to the data line through the link line.

Preferably, a plurality of the first through holes and a plurality of the corresponding second through holes are uniformly disposed on the link line.

In contrast to the existing technology, for the array substrate and the liquid crystal display panel of the present invention, a plurality of first through holes and a plurality of second through holes are disposed on the link line within the non-display area. The first through holes are used to expose the first metal line, so as to make the conductive line of the pixel electrode layer to electrically connect to the first metal line; the second through holes are used to expose the second metal line, so as to make the conductive line of the pixel electrode layer to electrically connect to the second metal line. The first metal line is electrically connected to the second metal line through the conductive line. The advantage of this design is that there are a plurality of connected points added in the same circuit, so as to make a conduction between the first metal line and the second metal line. Therefore, if one metal layer of the non-display area is broken, it only affects a small part of the circuit to be not able to transmit signals, and does not affect the overall metal line with the broken metal layer to transmit signals. Thus, the problem of vertical and parallel light lines of a drain discharge module can be efficiently improved.

To allow the above description of the present invention to be more clear and comprehensive, there are preferred embodiments with the accompanying figures described in detail below.

DETAILED DESCRIPTION OF THE PREFERRED EMBODIMENTS

The word "embodiment" used in this specification means examples, demonstrations, or illustrations. In addition, the word "a" used in this specification and the corresponding claims can be explained as "one or more", unless it is designated or clearly guided to a singular form.

Display panels of the present invention can be a thin film transistor liquid crystal display (TFT-LCD) or an active matrix organic light emitting diode (AMOLED).

In an embodiment of the present invention, a plurality of first through holes and a plurality of second through holes are disposed on the non-display area. The first through holes are used to expose the first metal line, so as to make the conductive line of the pixel electrode layer to electrically connect to the first metal line; the second through holes are used to expose the second metal line, so as to make the conductive line of the pixel electrode layer to electrically connect to the second metal line. The first metal line is electrically connected to the second metal line through the conductive line. The advantage of this design is that there are a plurality of connected points added in the same circuit, so as to make a conduction between the first metal line and the second metal line. Therefore, if one metal layer of the non-display area is broken, it only affects a small part of the circuit to be not able to transmit signals, and does not affect the overall metal line with the broken metal layer to transmit signals. Thus, the problem of vertical and parallel light lines of a drain discharge module can be efficiently improved.

To explain the technical solution of the present invention, there are some specific embodiments below.

Figure 1:
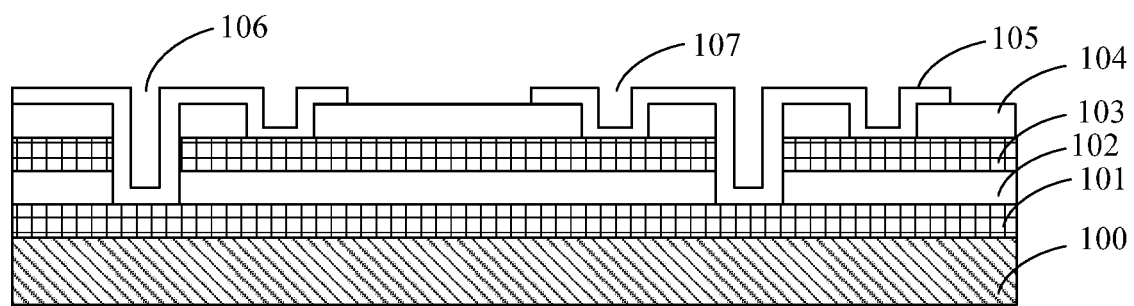
FIG. 1 is a structural diagram of an array substrate within a non-display area according to a preferred embodiment of the present invention.

Refer to FIG. 1, which is a structural diagram of an array substrate within a non-display area according to a preferred embodiment of the present invention. For convenience of description, FIG. 1 only represents the related parts of the present embodiment of the present invention.

The array substrate includes: a substrate 100, a first metal layer 101, a first insulation layer 102, a second metal layer 103, a second insulation layer 104, and a pixel electrode layer 105. The first metal layer 101 is disposed on the substrate 100; the first insulation layer 102 is disposed on the first metal layer 101; the second metal layer 103 is disposed on the first insulation layer 102; the first insulation layer 102 is used to isolate the first metal layer 101 from the second metal layer 103; the second insulation layer 104 is disposed on the second metal layer 103; the pixel electrode layer 105 is disposed on the second insulation layer 104; the second insulation 104 is used to isolate the second metal layer 103 from the pixel electrode layer 105.

In the embodiment of the present invention, the first metal layer 101 is deposited on the substrate 100. Next, the present invention uses yellow lights and etching processes to generate a pattern of the first metal layer 101. The pattern of the first metal layer 101 comprises a gate of a thin film transistor and a scan line of a display area, and a first metal line of a non-display area. However, it can be understood that the first metal line has a plurality of lines.

In the embodiment of the present invention, after sputtering and depositing the second metal layer 103, the present invention uses yellow lights and etching processes to generate a pattern of the second metal layer 103. The pattern of the second metal layer 103 is formed with a source of the thin film transistor, a drain of the thin film transistor and a data line within the display area, and a second metal line within the non-display area. However, it can be understood that the second metal line comprises a plurality of lines, each one of the first metal lines is corresponding to each one of the second metal lines.

In the embodiment of the present invention, after sputtering and depositing the pixel electrode layer 105, the present invention uses yellow lights and etching processes to generate a pattern of the pixel electrode layer 105. The pattern of the pixel electrode layer 105 comprises pixel electrodes within the display area and a conductive line within the non-display area. However, it can be understood that, the conductive line has a plurality of lines, and each one of the first metal lines, each one of the second metal lines, and each one of the conductive lines are corresponding to each other.

In the embodiment of the present invention, the first metal line, the second metal line, and the conductive line are overlapped with each other to be a link line, wherein a plurality of link lines are electrically connected to the corresponding scan lines and data lines respectively. A plurality of first through holes 106 and a plurality of corresponding second through holes 107 are disposed on the link line. The first through holes 106 are used to expose the first metal line, so as to make the conductive line of the pixel electrode layer to electrically connect to the first metal line; the second through holes 107 are used to expose the second metal line, so as to make the conductive line of the pixel electrode layer to electrically connect to the second metal line. The first metal line within the first through hole is electrically connected to the second metal line within the second through hole through the conductive line.

In the embodiment of the present invention, the pixel electrode layer 105 is made of Indium Tin Oxide (ITO) or Indium Zinc Oxide (IZO). The first insulation layer 102 is made of G-Sinx materials. The second insulation layer 104 is made of P-Sinx materials. However, the present invention is not limited to the use of the above materials. Modifications, replacements and improvements within the spirit and principles of the present invention are within the scope of the present invention.

In the embodiment of the present invention, after generating the second insulation layer 104, a via-hole etching is executed. Namely, the first through holes 106 are disposed on the second insulation layer 104, the second metal layer 103, and the first insulation layer 102 of the non-display area. The first through hole penetrates the second insulation layer 104, the second metal layer 103, and the first insulation layer 102 of the non-display area, so as to expose the first metal line and make the conductive line of the pixel electrode layer to electrically connect to the first metal line.

However, we can understand that, after generating the second insulation layer 104, at the same process for disposing the first through holes, the second through hole 107 is disposed on the second insulation layer 104 within the non-display area, so as to expose the second metal line and make the conductive line of the pixel electrode layer to electrically connect to the second metal line.

However, we can understand that, after finishing the process of the first through holes, the via-hole etching process of the second through holes is executed. Namely, the second insulation layer with the non-display area executes the via-hole etching to obtain the second through hole, so as to expose the second metal line and make the conductive line of the pixel electrode layer to electrically connect to the second metal line.

In the embodiment of the present invention, after disposing the first through hole 106 and the second through hole 107, sputtering and depositing a pixel electrode layer 105, the pixel electrode of the display area and the conductive line of the non-display area are generated. There are the first through hole and second through hole, therefore, the conductive line of the pixel electrode layer is electrically connected to the first metal line, and the conductive line of the pixel electrode layer is electrically connected to the second metal line.

The first preferred embodiment of the present invention, the first through hole 106 is corresponding to two of the second through holes 107, wherein the second through holes 107 are disposed at two sides of the first through hole 106. However, it can be understood that, the number of the first through holes and the second through holes can be adjusted according to the practical requirements. A plurality of the first through holes and a plurality of the corresponding second through holes are uniformly disposed on the link line. The first through holes and the second through holes are spaced apart, and the space distance is set according to the practical requirements.

Figure 2:
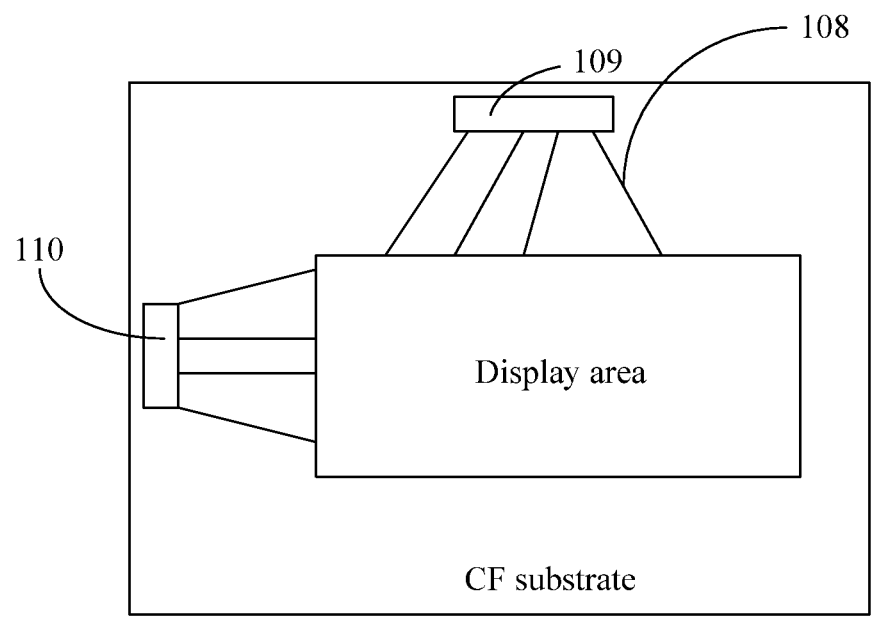
FIG. 2 is a structural diagram of the liquid crystal display panel according to an embodiment of the present invention.

In the embodiment of the present invention, referring to FIG. 2, the array substrate further comprises a scan driving chip 110 and a data driving chip 109. The scan driving chip 110 is electrically connected to the scan line through the link line 108, and the data driving chip 109 is electrically connected to the data line through the link line 108.

In summary, a plurality of first through holes and a plurality of second through holes are disposed on the non-display area. The first through holes are used to expose the first metal line, so as to make the conductive line of the pixel electrode layer to electrically connect to the first metal line; the second through holes are used to expose the second metal line, so as to make the conductive line of the pixel electrode layer to electrically connect to the second metal line. The first metal line is electrically connected to the second metal line through the conductive line. The advantage of this design is that there are a plurality of connected points added in the same circuit, so as to make a conduction between the first metal line and the second metal line. Therefore, if one metal layer of the non-display area is broken, it only affects a small part of the circuit to be not able to transmit signals, and does not affect the overall metal line with the broken metal layer to transmit signals. Thus, the problem of vertical and parallel light lines of a drain discharge module can be efficiently improved.

Refer to FIG. 1 and FIG. 2, the embodiment of the present invention discloses a liquid crystal display panel. For convenience of description, FIG. 1 and FIG. 2 only represent the related parts of the present embodiment of the present invention. The liquid crystal display panel comprises an array substrate, a color filter substrate, and a liquid crystal cell disposed between the array substrate and the color filter substrate.

The array substrate includes: a substrate 100, a first metal layer 101, a first insulation layer 102, a second metal layer 103, a second insulation layer 104, and a pixel electrode layer 105. The first metal layer 101 is disposed on the substrate 100; the first insulation layer 102 is disposed on the first metal layer 101; the second metal layer 103 is disposed on the first insulation layer 102; the first insulation layer 102 is used to isolate the first metal layer 101 from the second metal layer 103; the second insulation layer 104 is disposed on the second metal layer 103; the pixel electrode layer 105 is disposed on the second insulation layer 104; the second insulation 104 is used to isolate the second metal layer 103 from the pixel electrode layer 105.

In an embodiment of the present invention, the first metal line, the second metal line and the conductive line are overlapped with each other to be a link line. A plurality of first through holes 106 and a plurality of corresponding second through holes 107 are disposed on the link line. The first through holes 106 are used to expose the first metal line, so as to make the conductive line of the pixel electrode layer to electrically connect to the first metal line; the second through holes 107 are used to expose the second metal line, so as to make the conductive line of the pixel electrode layer to electrically connect to the second metal line. The first metal line within the first through hole is electrically connected to the second metal line within the second through hole through the conductive line.

In the embodiment of the present invention, the first through hole 106 is disposed on the second insulation layer, the second metal layer, and the first insulation layer within the non-display area. The second through hole 107 is disposed on the second insulation layer within the non-display area.

The first preferred embodiment of the present invention, the first through hole 106 is corresponding to two of the second through holes 107, wherein the second through holes 107 are disposed at two sides of the first through hole 106. A plurality of the first through holes and a plurality of the corresponding second through holes are uniformly disposed on the link line. The first through holes 106 and the second through holes 107 are spaced apart, and the space distance is set according to the practical requirements.

In the embodiment of the present invention, the array substrate further comprises a scan driving chip 110 and a data driving chip 109. The scan driving chip 110 is electrically connected to the scan line through the link line 108, and the data driving chip 109 is electrically connected to the data line through the link line 108.

However, it can be understood that the number of the first through holes and the second through holes can be adjusted according to the practical requirements.

In summary, for the array substrate and the liquid crystal display panel of the present invention, a plurality of first through holes and a plurality of second through holes are disposed on the link line within the non-display area. The first through holes are used to expose the first metal line, so as to make the conductive line of the pixel electrode layer to electrically connect to the first metal line; the second through holes are used to expose the second metal line, so as to make the conductive line of the pixel electrode layer to electrically connect to the second metal line. The first metal line is electrically connected to the second metal line through the conductive line. The advantage of this design is that there are a plurality of connected points added in the same circuit, so as to make a conduction between the first metal line and the second metal line. Therefore, if one metal layer of the non-display area is broken, it only affects a small part of the circuit to be not able to transmit signals, and does not affect the overall metal line with the broken metal layer to transmit signals. Thus, the problem of vertical and parallel light lines of a drain discharge module can be efficiently improved.

There are one or more implementations represented or described for the present invention, but those who are skilled in the art may provide some equivalent variations and modifications based on the understanding of the specification and the figures. The present invention comprises all the equivalent variations and modifications and is only constrained by the claims. Especially regarding the various functions of the above described components, the terms describing the components mean corresponding to any element (unless specially defined) with a specified function (for example, with the equivalent function) of the implemented component, even if there is a different structure in comparison to the exemplary embodiments of the present specification. Furthermore, even though the specification discloses only an implementation of the specified feature, the specified feature can be combined with other characteristics if there are some advantages. In addition, the terms "including", "having", or other like terms used in detailed description or claims are similar to the meaning of the word "comprising."

In summary, the present invention has been described with preferred embodiments thereof, but the above described preferred embodiments are not intended to limit the present invention. Those who are skilled in the art can make many changes and modifications to the described embodiment which can be carried out without departing from the scope and the spirit of the invention that is intended to be limited only by the appended claims.

What is claimed is:

1. An array substrate, comprising:
   a substrate;
   a first metal layer disposed on the substrate, wherein the first metal layer is formed with a gate of a thin film transistor and a scan line within a display area, and a first metal line within a non-display area;
   a first insulation layer disposed on the first metal layer, wherein the first insulation layer isolates the first metal layer from a second metal layer;
   the second metal layer disposed on the first insulation layer; wherein the second metal layer is formed with a source of the thin film transistor, a drain of the thin film transistor and a data line within the display area, and a second metal line within the non-display area;

a second insulation layer disposed on the second metal layer, wherein the second insulation layer isolates the second metal layer from a pixel electrode layer;

the pixel electrode layer disposed on the second insulation layer; wherein the pixel electrode layer comprises pixel electrodes within the display area and a conductive line within the non-display area;

wherein the first metal line, the second metal line and the conductive line are overlapped with each other to be a link line, a plurality of first through holes and a plurality of corresponding second through holes are disposed on the link line; the first through holes expose the first metal line; the second through holes expose the second metal line; the first metal line in the first through hole is connected to the second metal line in the corresponding second through hole through the conductive line; the first through hole penetrates the second insulation layer, the second metal layer and the first insulation layer within the non-display area; the second through hole penetrates the second insulation layer within the non-display area; each of the first through holes is corresponding to two of the second through holes, wherein the second through holes are disposed at two sides of the first through hole.

2. The array substrate according to claim 1, wherein the array substrate further comprises a scan driving chip and a data driving chip, the scan driving chip is electrically connected to the scan line through the link line, and the data driving chip is electrically connected to the data line through the link line.

3. The array substrate according to claim 1, wherein a plurality of the first through holes and a plurality of the corresponding second through holes are uniformly disposed on the link line.

4. An array substrate, comprising:
a substrate;
a first metal layer disposed on the substrate, wherein the first metal layer is formed with a gate of a thin film transistor and a scan line within a display area, and a first metal line within a non-display area;
a first insulation layer disposed on the first metal layer, wherein the first insulation layer isolates the first metal layer from a second metal layer;
the second metal layer disposed on the first insulation layer; wherein the second metal layer is formed with a source of the thin film transistor, a drain of the thin film transistor and a data line within the display area, and a second metal line within the non-display area;
a second insulation layer disposed on the second metal layer, wherein the second insulation layer isolates the second metal layer from a pixel electrode layer;
the pixel electrode layer disposed on the second insulation layer; wherein the pixel electrode layer comprises pixel electrodes within the display area and a conductive line within the non-display area;
wherein the first metal line, the second metal line, and the conductive line are overlapped with each other to be a link line, a plurality of first through holes and a plurality of corresponding second through holes are disposed on the link line; the first through holes expose the first metal line; the second through holes expose the second metal line; the first metal line in the first through hole is connected to the second metal line in the corresponding second through hole through the conductive line.

5. The array substrate according to claim 4, wherein the first through hole penetrates the second insulation layer, the second metal layer, and the first insulation layer within the non-display area; and the second through hole penetrates the second insulation layer within the non-display area.

6. The array substrate according to claim 4, wherein each of the first through holes is corresponding to two of the second through holes, wherein the second through holes are disposed at two sides of the first through hole.

7. The array substrate according to claim 4, wherein the array substrate further comprises a scan driving chip and a data driving chip, the scan driving chip is electrically connected to the scan line through the link line, and the data driving chip is electrically connected to the data line through the link line.

8. The array substrate according to claim 4, wherein a plurality of the first through holes and a plurality of the corresponding second through holes are uniformly disposed on the link line.

9. An liquid crystal display panel, comprising an array substrate, a color filter substrate, and a liquid crystal cell disposed between the array substrate and the color filter substrate, wherein the array substrate comprises:
a substrate;
a first metal layer disposed on the substrate, wherein the first metal layer is formed with a gate of a thin film transistor and a scan line within a display area, and a first metal line within a non-display area;
a first insulation layer disposed on the first metal layer, wherein the first insulation layer isolates the first metal layer from a second metal layer;
the second metal layer disposed on the first insulation layer; wherein the second metal layer is formed with a source of the thin film transistor, a drain of the thin film transistor and a data line within the display area, and a second metal line within the non-display area;
a second insulation layer disposed on the second metal layer, wherein the second insulation layer isolates the second metal layer from a pixel electrode layer;
the pixel electrode layer disposed on the second insulation layer; wherein the pixel electrode layer comprises pixel electrodes within the display area and a conductive line within the non-display area;
wherein the first metal line, the second metal line, and the conductive line are overlapped with each other to be a link line, a plurality of first through holes and a plurality of corresponding second through holes are disposed on the link line; the first through holes expose the first metal line; the second through holes expose the second metal line; the first metal line in the first through hole is connected to the second metal line in the corresponding second through hole through the conductive line.

10. The liquid crystal display panel according to claim 9, wherein the first through hole penetrates the second insulation layer, the second metal layer and the first insulation layer within the non-display area; and the second through hole penetrates the second insulation layer within the non-display area.

11. The liquid crystal display panel according to claim 9, wherein each of the first through hole is corresponding to two of the second through holes, wherein the second through holes are disposed at two sides of the first through hole.

12. The liquid crystal display panel according to claim 9, wherein the array substrate further comprises a scan driving chip and a data driving chip, the scan driving chip is electrically connected to the scan line through the link line, and the data driving chip is electrically connected to the data line through the link line.

13. The liquid crystal display panel according to claim 9, wherein a plurality of the first through holes and a plurality of the corresponding second through holes are uniformly disposed on the link line.

\* \* \* \* \*